US009117236B1

(12) United States Patent
Feinstein

(10) Patent No.: US 9,117,236 B1
(45) Date of Patent: Aug. 25, 2015

(54) ESTABLISHING COMMUNICATION BASED ON ITEM INTEREST

(71) Applicant: Amazon Technologies, Inc., Reno, NV (US)

(72) Inventor: Brian J. Feinstein, Mercer Island, WA (US)

(73) Assignee: Amazon Technologies, Inc., Reno, NV (US)

(*) Notice: Subject to any disclaimer, the term of this patent is extended or adjusted under 35 U.S.C. 154(b) by 249 days.

(21) Appl. No.: 13/753,282

(22) Filed: Jan. 29, 2013

Related U.S. Application Data

(63) Continuation of application No. 12/643,224, filed on Dec. 21, 2009, now Pat. No. 8,386,340.

(51) Int. Cl.
*G06Q 30/00* (2012.01)
*G06Q 30/06* (2012.01)
*G06Q 50/00* (2012.01)

(52) U.S. Cl.
CPC ........ *G06Q 30/0623* (2013.01); *G06Q 30/0641* (2013.01); *G06Q 50/01* (2013.01)

(58) Field of Classification Search
CPC .............. G06Q 30/06; G06Q 30/0601; G06Q 30/0641; G06Q 50/01; G06Q 99/00
USPC ........................................ 705/26.1, 27.1, 319
See application file for complete search history.

(56) References Cited

U.S. PATENT DOCUMENTS

| | | | |
|---|---|---|---|
| 6,249,282 B1* | 6/2001 | Sutcliffe et al. | 715/751 |
| 6,466,570 B1 | 10/2002 | Low et al. | |
| 6,751,299 B1 | 6/2004 | Brown et al. | |
| 7,542,916 B2* | 6/2009 | Mandalia et al. | 705/7.24 |
| 7,630,986 B1 | 12/2009 | Herz et al. | |
| 7,634,428 B1 | 12/2009 | Varatharajah | |
| 7,647,378 B2 | 1/2010 | Thuerk | |
| 7,899,710 B1 | 3/2011 | Walker et al. | |
| 7,925,542 B2 | 4/2011 | Shah | |
| 8,060,463 B1* | 11/2011 | Spiegel | 707/609 |
| 8,386,340 B1* | 2/2013 | Feinstein | 705/27.1 |
| 2005/0251566 A1 | 11/2005 | Weel | |
| 2005/0283345 A1 | 12/2005 | Trabona | |
| 2007/0244739 A1 | 10/2007 | Soito et al. | |
| 2008/0077484 A1 | 3/2008 | Main et al. | |
| 2009/0164287 A1 | 6/2009 | Kies et al. | |
| 2009/0276400 A1 | 11/2009 | Jaffer et al. | |
| 2010/0011295 A1 | 1/2010 | O'Connor et al. | |
| 2011/0106662 A1 | 5/2011 | Stinchcomb | |

OTHER PUBLICATIONS

Chiranky, L., "Web Power: Taking Call Centers to New Dimensions," Telemarketing & Call Centers, vol. 15, No. 7, p. 96, Jan. 1997.*

(Continued)

*Primary Examiner* — Nicholas D Rosen
(74) *Attorney, Agent, or Firm* — Lee & Hayes, PLLC

(57) ABSTRACT

Interactions between an item and an online shopper may be used to determine interest in an item or a category of items. Once interest has been determined, the online shopper may be presented with an option to initiate communication with other users. This communication may be between a plurality of users including shoppers, owners, experts, item representatives, and so forth. Communication may include text chat, video chat, audio chat, telephone, and so forth. Rewards may be provided to some or all users to encourage communication.

18 Claims, 12 Drawing Sheets

(56) References Cited

OTHER PUBLICATIONS

Chiranky, L., "Customer Advocacy Paradigm: the Bonnie Button and Beyond," Telemarketing & Call Centers, vol. 15, No. 7, p. 98, Jan. 1997.*

Pulliam, P., "To Web or not to Web? Is not the Question, but Rather: When and How to Web?", Direct Marketing, vol. 62, No. 1, pp. 18-24, May 1999.*

Degemmis, M., et al., "Text Learning for User Profiling in E-Commerce" (Abstract), International Journal of System Science, vol. 37. No. 13, pp. 905-918, Oct. 20, 2006.*

Farkas, M. "Open Everything: Embracing Web 2.0 in the City of Brotehrly Love," American Libraries, vol. 39, No. 3, p. 34, Mar. 2008.*

U.S. Appl. No. 12/643,224, filed Dec. 21, 2009, Brian J. Feinstein, "Establishing Communication Based on Item Interest".

Non-Final Office Action for U.S. Appl. No. 12/643,224, mailed on Apr. 27, 2012, Brian J. Feinstein et al., "Establishing Communication Based on Item Interest", 29 pages.

Degemmis et al., "Text learning for user profiling in e-commerce", International Journal of Systems Science, Oct. 20, 2006, vol. 37, No. 13, pp. 905-918.

* cited by examiner

ESTABLISHING COMMUNICATION BASED ON ITEM INTEREST

CROSS-REFERENCES TO RELATED APPLICATIONS

This application is a continuation of U.S. patent application Ser. No. 12/643,224 filed Dec. 21, 2009, now U.S. Pat. No. 8,386,340, issued Feb. 26, 2013, the entire contents of which are incorporated herein by reference in its entirety for all purposes.

BACKGROUND

A large and growing population of users spends increasing amounts of time shopping, reviewing, and supporting goods and services offered via online stores. With an ever-growing array of goods and services available to these users, there is increasing opportunity and need to enhance user experience during online shopping.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
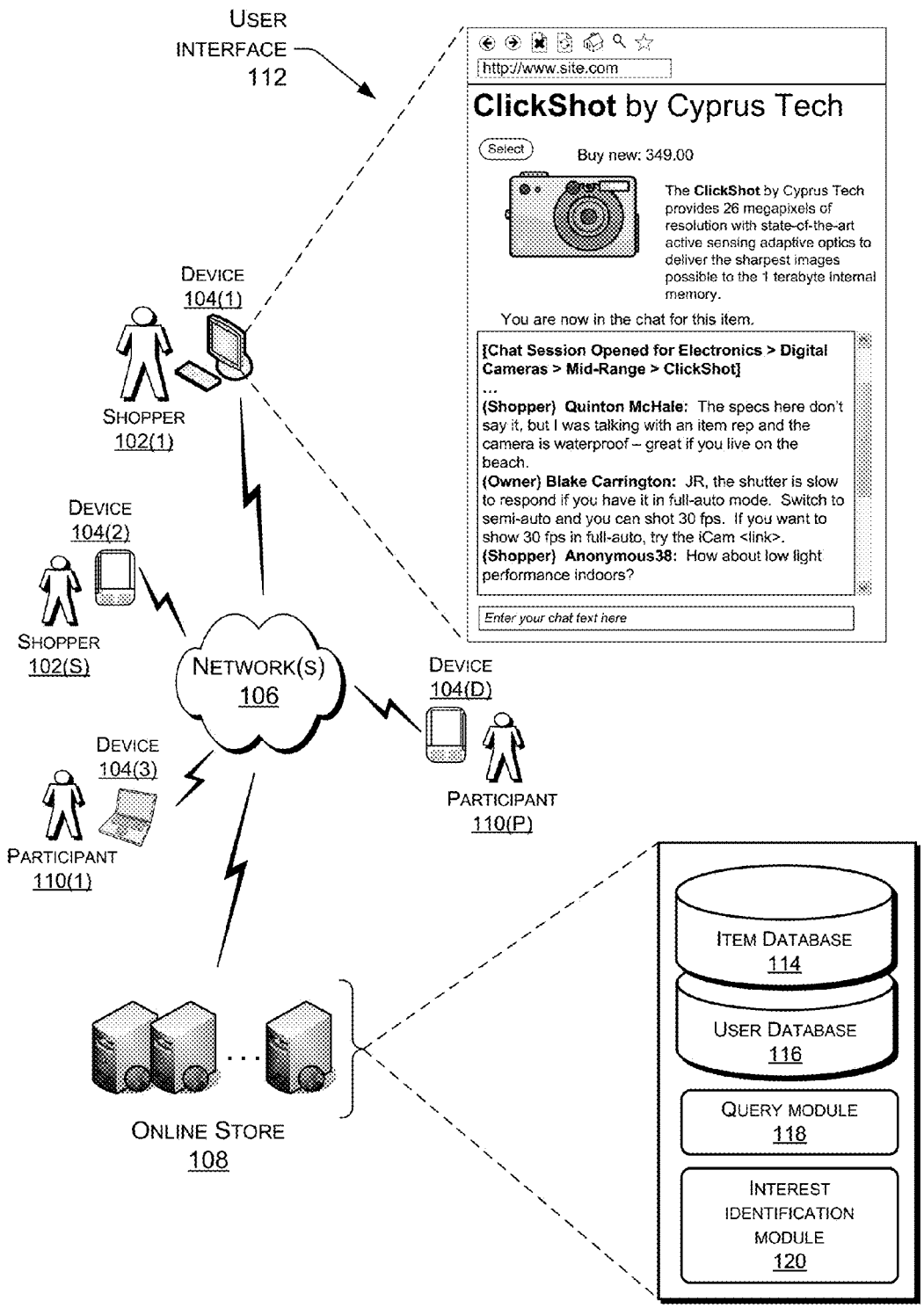
FIG. 1 illustrates an architecture in which an online store determines that certain users have an interest in an item and provides a communication pathway (e.g., a chat session) between these users based at least in part on this determination.

This disclosure describes techniques for determining when a shopper is interested in an item or a category of items and, in response, providing the shopper with the opportunity to establishing communication with others about the item. For instance, the techniques may facilitate a chat session between the shopper and other users interested in the item. This chat session may involve text, audio, video, and so forth. A "shopper" is a person or entity which is interested in acquiring rights in or to an item, but has not yet done so. An "item" encompasses both goods and services, while the term "users" includes shoppers as well as other participants who may wish to chat about an item. A given user may be both a shopper and participant, depending upon context. For example, a user who has been a participant in chats relating to a piece of camera equipment he owns may also be a shopper when looking to purchase a telephoto lens.

As described below, an interest identification module monitors access to an item database to determine when a user is interested in an item or a category of items. Once interest in an item or category of items has been determined, the user may be provided with an opportunity to join or create a chat regarding the item or category with other users.

The interest identification module may determine a user's interest in an item or category in several ways. For example, if the user has viewed a particular item more than a certain number times in a certain number of days (e.g., more than five times within three days), then the interest identification module may deem the user interested in the item. In another example, if a user's list of desired items (i.e., a "wish list") includes the item, then the interest identification module may deem the user interested in the item. In yet another example, the user following a link associated with an item or a category of items or the user being referred to an item or a category by another user or system may result in the interest identification module deeming the user interested in the item or the category.

Once the interest identification module deems a user interested in an item or category of items, the user is presented with a control that allows the user to enter an existing chat group regarding the item or to initiate a new chat group regarding the item. Each of these chat groups may include other users, including other shoppers, other participants (such as owners of the item), users that have been deemed experts in this item or in an associated category of items, users that represent the item, and so forth. Thus, access to the chat groups is limited to those who have a discernable interest in the item.

The discussion begins with a section entitled "Illustrative Architecture," which describes a non-limiting architecture in which the claimed techniques may be implemented. This section illustrates and describes several user interfaces (UIs) associated with this architecture. A section entitled "Illustrative Processes" follows. This section illustrates and describes flow diagrams for the process. Finally, a brief conclusion ends the discussion.

This brief introduction, including section titles and corresponding summaries, is provided for the reader's convenience and is not intended to limit the scope of the claims, nor the proceeding sections. Furthermore, the techniques described in detail below may be implemented in a number of ways and in a number of contexts. Several example implementations and their context are provided with reference to the following figures, as described below in more detail. However, it is to be appreciated that the following implementations and contexts are but one of many.

Illustrative Architecture

FIG. 1 shows an illustrative architecture 100 for determining when users, such as online shoppers of an online store, are interested in a particular item and for facilitating communication between these users in response to making this determination. For instance, the techniques described below may enable a user that is interested in a particular item or category of items to join or initiate a chat session including multiple other users that have also been deemed to be interested in the particular item or category of items.

For clarity of illustration, interest in a particular item is discussed below, however it is understood that the same techniques may be applied to determine interest in one or more categories of items. A category includes a grouping of items having one or more common traits. For example, a category "digital photography" may include items such as cameras, tripods, photo printers, and so forth. In another example, a category may include books by a particular author, books in a particular series, books about a particular subject, and so forth. Categories of items may be defined at any level of granularity.

As illustrated, each of shoppers 102(1), . . . , 102(S) may use respective devices 104(1), . . . , 104(D) to connect to network 106 and interact with an online store 108. For instance, shopper 102(1) may use a desktop computer 104(1) to access the online store, while shopper 102(S) uses an electronic book ("eBook") reader device. As used in this application, letters within parentheses, such as "(S)" or "(D)", denote any integer number greater than or equal to zero.

Network 106 may be any type of communication network, including the Internet, a local area network, a wide area network, a wireless wide area network (WWAN), a cable television network, a wireless network, a telephone network, etc. In short, network 106 allows communicative coupling between devices 104(1)-(D) and online store 108.

Online store 108 may comprise one or more computing devices configured to provide access to items (i.e., goods, services or a combination thereof) via network 106. In addition to interacting with shoppers 102(1)-(S), online store 108 may also interact with participants 110(1), . . . , 110(P). These participants may include prior purchasers of items offered by the online store or another store, owners of these items, users that have provided reviews for or have commented on these items, users deemed experts with regards to the items, users that are item representatives of these items, and so forth.

As illustrated, participants 110(1)-(P) may also use devices 104 to access the online store 108. For example, participant 110(1) uses laptop device 104(3) to access the online store 108 via network 106, while participant 110(P) uses another e-book reader 104(D) to access the online store 108 via the network 106. While these example devices are shown for purposes of illustration and discussion, it is noted that many other electronic devices may be used, such as, cellular telephones, portable media players, tablet computers, netbooks, notebooks, gaming consoles, media centers, and the like.

Online store 108 may provide a user interface ("UI") 112 to shoppers 102(1)-(S) and participants 110(1)-(P). This UI 112 provides shoppers 102(1)-(S) and participants 110(1)-(P) with controls and displays suitable for establishing communication between users that are each determined to be interested in a particular item or class of items. For instance, the UI 112 may facilitate a chat session between shoppers or other participants that are deemed to be interested in a same item. Illustrations and additional details regarding the user interface 112 are provided below with regards to FIGS. 2-8.

Online store 108 may store or otherwise have access to an item database 114 stored in a memory and configured to include information about items that are available through the online store. The online store 108 may provide items for sale, lease, rental, subscription, and so forth. These items may include digital content objects, such as music, video, or executable files.

Online store 108 may also store or otherwise have access to a user database 116. User database 116 may be configured to store user information such as user preferences, as well as how the user accesses information in the item database 114. For example, user database 116 may contain information about shopper 102(1) and a search for digital cameras initiated by shopper 102(1) at the online store 108. Users may be presented with options to maintain privacy of their information or limit collection of such data. For example, shoppers may be presented with an option to "opt in" or opt out" of usage tracking that can be associated with their user account in the user database 116.

Online store 108 may also have access to a query module 118. Query module 118 may be configured to receive queries from a querying party, such as shopper 102(1), participant 110(1), and so forth, and to execute searches based on these received queries. These queries may be executed by search databases, such as item database 114, which are accessible to the online store 108. After executing the search, the results are provided to the querying party.

Finally, the online store 108 may store or otherwise have access to an interest identification module 120. Interest identification module 120 may access item database 114, user database 116, query module 118, or combinations thereof to determine whether a user, such as one of shoppers 102(1)-(S), has an interest in a particular item that is greater than a pre-determined threshold. The interest identification module 120 may deem a user interested in an item using several parameters, which may be configured by a system administrator or the user herself.

In one instance, the interest identification module 120 determines that a user is interested in a particular item based on one or more of numerous different factors, such as the presence of the particular item on a specified list associated with the user. For example, a user who places an item into a shopping cart may be considered interested in the item. Conversely, a user viewing a particular item or a class of items a certain number times within a certain number of hours (e.g., three times within ten hours) may also be deemed interested in that item or in items within that class. Determination of interest is discussed in more depth immediately below with reference to FIG. 2.

Figure 2:
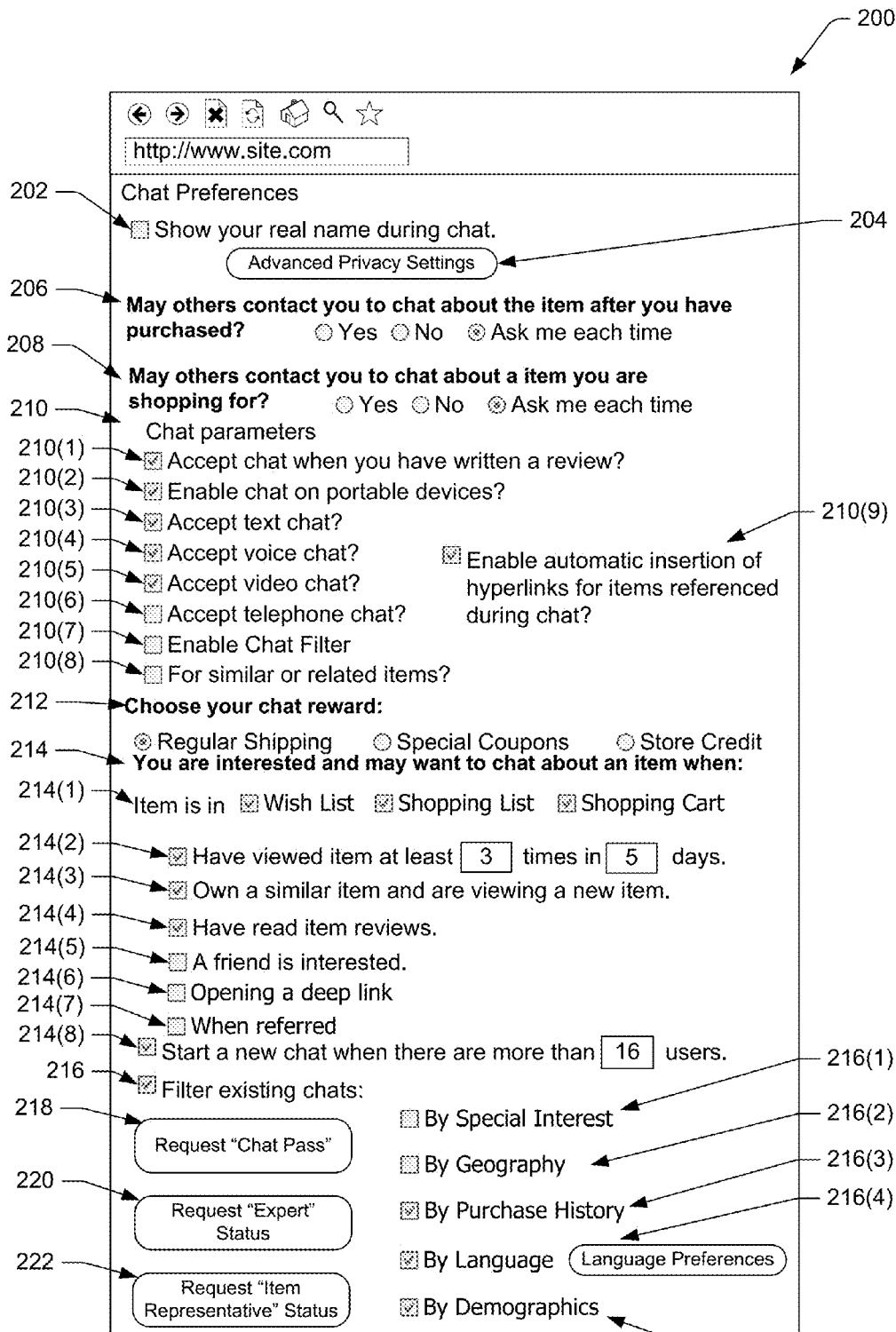
FIG. 2 illustrates a user interface (UI) that enables a user of the online store to select chat preferences.

The user interfaces (UIs) shown in FIGS. 2-8 may be presented on client devices 104(1)-(D). FIG. 2 illustrates a UI illustrated example chat preferences 200. These chat preferences may be configured by a system administrator, the user, or a combination thereof. In some implementations, these preferences may be global such that they affect each chat that a user participates in, or these parameters may be more narrowly defined. For example, a user may set preferences for chats about electronic devices which differ from preferences associated with musical instruments. Furthermore, these preferences may be global across all users, user specific, or a combination thereof, which may allow a set of global preferences to affect each user while individual users set a specific subset of preferences.

At 202, a user may specify whether to show a real name during a chat. Selection of this option results in the user's real name appearing in a chat session, while a screen name (or "handle") associated with the user may be displayed when the user does not select this option. At 204, advanced privacy settings are accessible, such as when or where to display a real name, whether to show a user's hometown, and so forth. In this example, the user has selected to not show a real name during chat.

At 206, a user may specify whether other users may contact them to chat about an item after purchase of the item by the user. For example, a user may choose to always allow others to contact them, to always deny others, or to be prompted at each purchase. In this example, the user has selected "ask me each time" and, thus, will receive a prompt at checkout each time that the user purchases an item.

At 208, the user may also indicate whether other users may contact them to chat about an item before purchase of the item by the user. For example, when enabled, a shopper that is deemed to be interested in a digital camera would be presented with an invitation to start or join a chat with others who are also shopping for digital cameras.

At 210, several chat parameters may be configured. At 210(1) the user may specify whether to accept a chat for a particular item when the user has previously written a review for the item. For example, a user may have written a detailed review about the particular item, but does not wish to discuss the item further. On the other hand, a user may be amenable to further discussions about the item and, as such, may encourage or at least allow others to contact him to chat about the item.

At 210(2) the user may indicate whether they wish to chat on portable devices. For example, a user may wish to chat only on a mobile device, but not while at a desktop computer. At 210(3), (4), (5) and (6), the user may indicate whether they wish to chat via text, voice, video, or telephone, respectively. In this example, the user has indicated that he will accept all chat modes except telephone.

At 210(7) the user may specify whether to enable a chat filter. The chat filter may be configured to remove, obscure, flag, or modify potentially objectionable content, such as profanity, political references, and so forth.

At 210(8) the user may indicate whether they will accept a chat for similar or related items. For example, a user may own an older model of a particular item. When selected, the user may be included in a chat with a shopper interested in a newer model of the item. In some implementations, the degree and extent of similarity or relation may be specified. For example, digital cameras may be deemed to be related when the cameras are offered in the same manufacturer's product line.

At 210(9) the user may set a chat parameter to enable the automatic insertion of hyperlinks for items referenced during a chat. When enabled, upon entry of a reference to another item in the chat, a hyperlink or other reference pointer to that item is inserted into the chat stream. Thus, users of the chat are able to easily able to follow the links and view information about items mentioned during the chat. These hyperlinks may be entered automatically, or by users manually inserting links.

Online store 108 may offer rewards to users as an incentive to participating in a chat. These rewards may be offered to eligible participants, which may include each participant in a chat or a subset of the participants. For instance, online store 108 may offer these rewards to owners and experts, but not to others such as shoppers and item representatives. For example, participants 110 such as owners and experts may receive rewards for participating in chats with shoppers 102, while other shoppers and item representatives may not.

Rewards offered may include concessions on shipping, special coupons, store credit, and so forth. That is, when these users participate in chat sessions, these users may receive certain benefits from doing so from the online store 108. At 212, the user has selected regular shipping as the reward of choice. Thus, when participating in a chat as an eligible participant, rewards may accrue to the benefit of the user in the form of future credit on shipping for the user's future purchases from online store 108.

With the UI of FIG. 2, users may also specify conditions and parameters that are then are used by the interest identification module 120 to determine when to deem the user "interested" in an item. In some implementations, these conditions may be used singly, or in combination with one another.

When a user places an item on a "wish list," a "shopping list," another designated list associated with the user, or a "shopping cart" of the user, the user may be deemed to be interested in the item. At 214(1), the user may select that they are interested when they include an item in one of these lists.

Interest may also be determined by patterns of access to information about the item. At 214(2), the user may indicate that an item is of interest when information about the item has been accessed more than a pre-determined number of times within a pre-determined time window. For example, the user may specify that the user should be deemed interested in an item that the user has viewed at least three times in the past five days.

At 214(3), a user may specify they are interested in an item when they view a new item that is similar to one they already own. For example, when active, a user who owns an e-book reader device would be deemed interested when viewing a newer model of an e-book reader device.

Interest may also be determined by accessing reviews of an item. At 214(4), the user may specify that an item is deemed of interest to the user after the user has read (or has written) a pre-determined number of reviews about the item (e.g., one, five, ten, etc.). For example, a shopper who reads a review about a "ClickShot" digital camera may be deemed interested in the camera, or the related category of items.

The interest of friends may also be used to determine interest by a user. At 214(5), for instance, the user may select an option stating that when a friend is interested in an item, the user should be deemed interested in that item as well. In one implementation, friends may be manually entered or determined from a social network in which the user participates.

Access to an item or category via a "deep link" or other address which directs a user to a specific item or category of items, rather than a home page, may also be used to determine interest. For example, a user may email a link to a specific digital camera to a recipient. In these instances, when control 214(6) is selected, opening of a deep link is used to indicate interest. Thus, a recipient who accesses the item via the link interest may be deemed interested.

A user, another online store, or a website, may refer users to a particular item or category of items. For example, a user may be reading about digital cameras at an online camera magazine. The user may then be referred to the category of items for "digital cameras" in the online store. At 214(8), this referral is used to indicate interest in the item or category of item.

Once interest has been determined, the user may be presented with a control to participate in a chat. However, large online stores may have many users shopping at the same time. To prevent situations such as chats with large numbers of participants, the user may specify when to initiate a new chat group. The user may also specify how to filter participants for selection in the chat group.

At 214(8), the user may indicate that a new chat should be initiated when there are more than a pre-determined number of users in a preexisting chat. For example, the user may specify to automatically generate a new chat when the user request to join a chat regarding a particular item or items and each of the preexisting chats regarding the item or the items include sixteen or more users.

The user may also choose to filter what chats they wish to join. At 216, a user may select to activate such filters. These filters may include chatting with others who share a special interest 216(1). Special interests may include, for instance, hobbies such as medieval art or electronics, political groups, social affiliations, and so forth. At 216(2), the user may select to filter chat participants by geography. For example, the user may wish to chat with others who live in the same city, state, country or the like. At 216(3), the user may filter by purchase history. For example, the user may wish to limit the chat to those who own several digital cameras.

At 216(4), the user may choose to filter the chat by specific languages, and such language preferences may be indicated. For example, a user may be able to speak Mandarin Chinese, but be unable to read Mandarin Chinese. Thus, a voice chat may be made available in this instance, while a text chat would not.

Finally, the user may filter the chat at 216(5) by demographic. These demographics may include age, occupation, family status, nationality, and so forth. Therefore, the user could, for instance, request to participate in chats composed partially or entirely of users that are of the same approximate age of the user (e.g., within five years of age of the user).

In one implementation, the online store 108 may present the option to chat about an item after determining the user is interested in the item using some or all of the factors discussed above. However, in some implementations certain users may be provided with an override, allowing them to see available chats even without an explicit determination of interest by interest identification module 120. These "chat passes" may be issued to users with specific attributes. These special attributes may include employment by the online store 108, recognition of significant purchases in a particular time or area, participation in a special shipping program, and so forth. For example, a professional photographer who regularly buys cameras and equipment may be permitted an override (or a "chat pass") to see what chats are in progress. At 218, the user may request a chat pass. In some implementations, the chat pass may be global across the entire online store 108, or category specific (such as specific to cameras, auto parts, and so forth).

Participants who have expertise about an item or item category may, at 220, request an "expert" status. In order to be granted such status, the online store 108 or an agent thereof may verify the credentials, seek feedback from other users, accept nominations, and so forth. In some instances, this expert status is based at least in part on a number of items previously purchased in a particular category by a user, a ranking of the reviews provided by the user on the online store 108, or the like.

At 222, users may request to be granted an "item representative" status. Item representatives may include those users that some represent an item or a class or category of items in some official manner. For instance, item representatives employees of an item manufacturer, distributor or retailer may be deemed "item representatives." In some implementations, item representatives are ineligible to receive rewards. As with experts, the online store 108 or an agent thereof may verify the credentials, seek feedback from other users, and so forth before granting a user an "item representative" or other special designated status.

Figure 3:
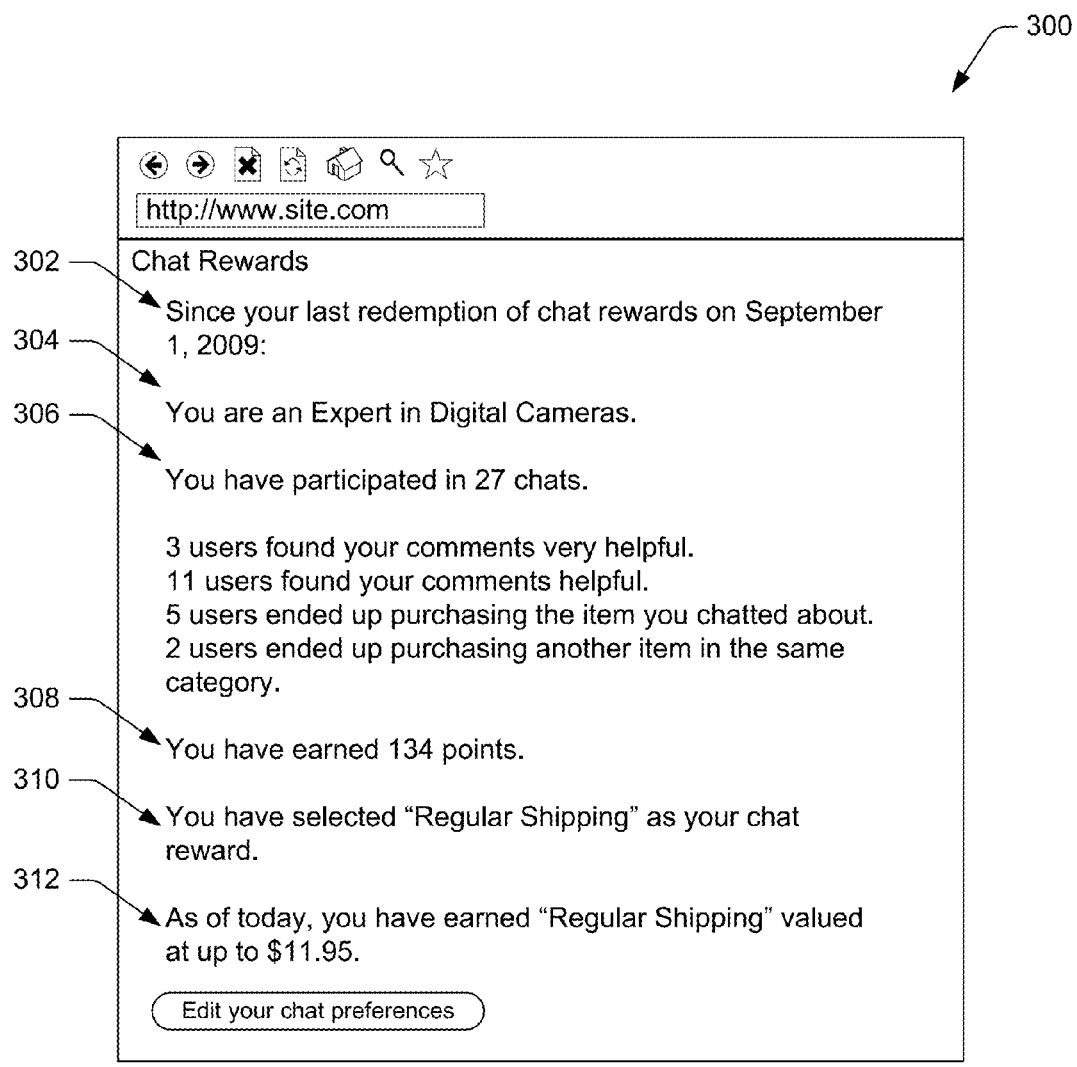
FIG. 3 illustrates a UI showing chat reward information for a user of the online store that participates in a chat or type of communication in the architecture of FIG. 1.

FIG. 3 illustrates another UI showing chat reward information 300. As described above, rewards may be provided to some or all users who participate in a chat. This UI illustrates an example user and their rewards that have been accrued to date. At 302, the UI indicates the last time chat rewards were redeemed. At 304, the user's status is shown. For example, this user has been deemed an "expert" in digital cameras. At 306, statistics about chat participation are shown. At 308, the number of chat points or other measurement of reward status may be displayed. At 310, the currently selected chat reward is shown, while 312 displays the current redemption value of that particular chat reward. For example, here the user has earned 134 points, which entitles the user to "regular shipping" up to an $11.95 value. Therefore, the user could redeem this reward on a future purchase of the user at online 108, for example, and would not have to pay shipping costs for the item up to $11.95.

Figure 4:
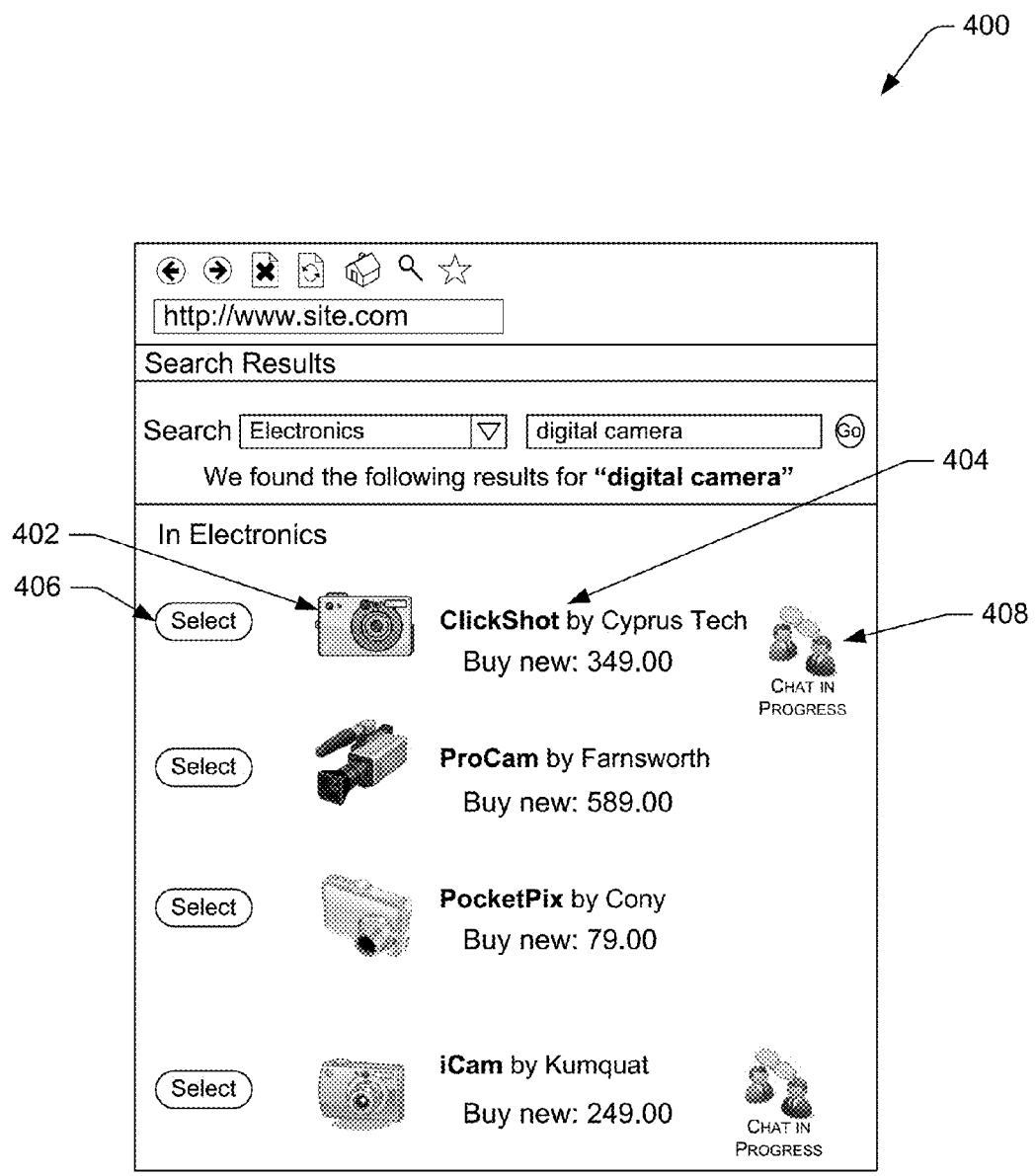
FIG. 4 illustrates a UI showing search results from the online store, rendered on a client device, and displaying indications that chats are in progress for specific items.

FIG. 4 illustrates a UI 400 showing search results provided by the online store 108 in response to receiving a query from a user. In this example a user such as shopper 102(1) is shopping for digital cameras. Shopper 102(1) has queried the online store 108 with the phrase "digital camera" and has received a list of search results as shown in 400. These search results include a picture of an item 402, a name for each item 404, and a select control 406 to select this item for purchase or to see additional information about the item.

Suppose that shopper 102(1) has been viewing several different digital cameras over the past couple of days. Based on this pattern of accessing the data relating to these items, the interest identification module 120 has determined that shopper 102(1) is interested in digital cameras. Upon determination of interest, a "chat in progress" icon 408 or other indicia may be presented to the shopper indicating that chats are currently taking place about items in the category of interest ("digital cameras" in this example).

For example, this illustration shows four items. Of these, the "ClickShot" and "iCam" digital cameras show the "chat in progress" icons 408. No chat is shown as being available for the "ProCam" or the "PocketPix," as no users are currently chatting about them.

Figure 5:
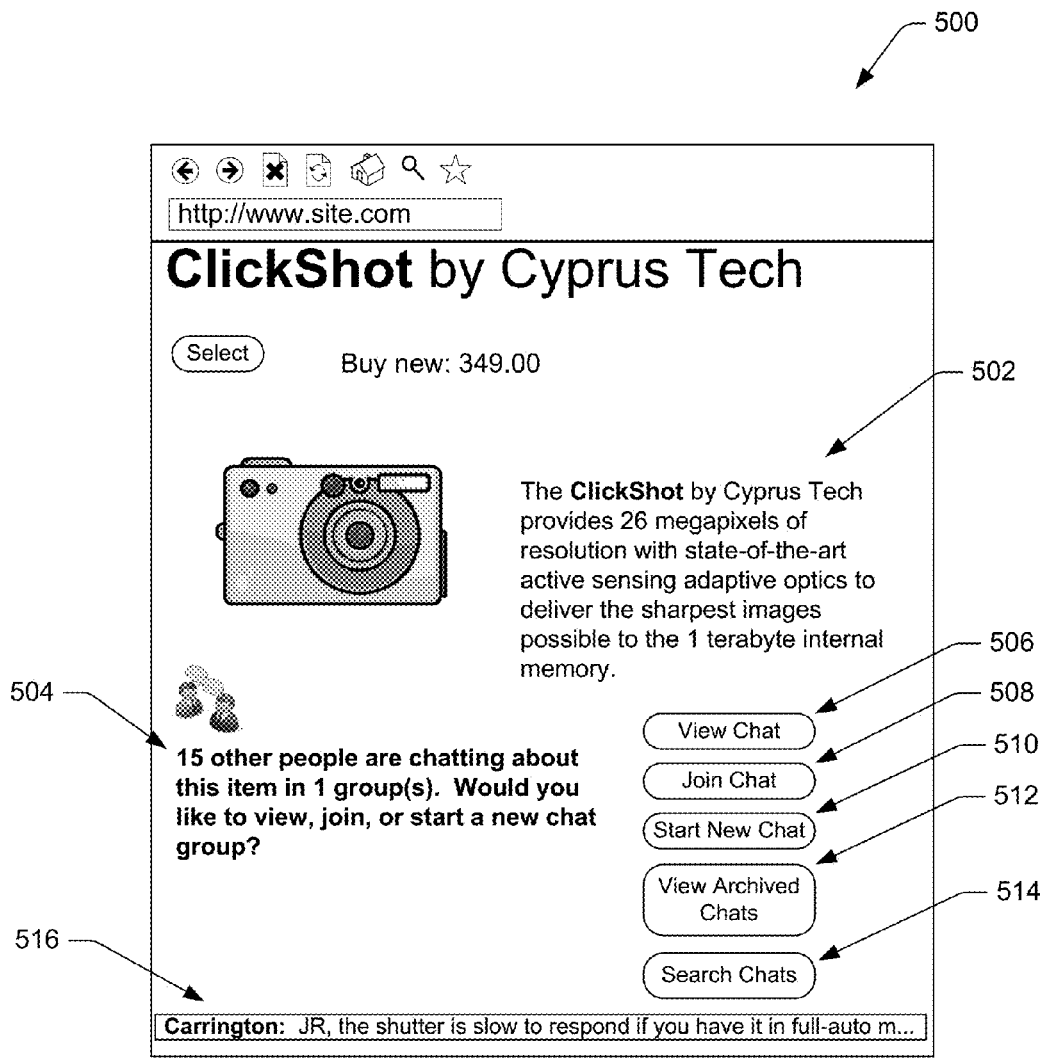
FIG. 5 illustrates a UI showing an item detail page and chat options related to the item detail page.

FIG. 5 illustrates a UI of a detail page 500 for an item. This detail page 500 may be presented after the user selects one of the items presented on the list of search results shown in FIG. 4 or otherwise. At 502, additional details about the item may be presented. At 504, details about an ongoing chat pertaining to this particular item are presented. In this example, 15 people are chatting about this in a single chat group. Controls may also be presented to access different aspects of the chat. At 506, a control may be presented to provide a view-only (non-interactive) presentation of the chat. In some implementations, this view-only mode may be presented to all users, while in other implementations users who have been determined to be interested in the item may be presented with this control. This view-only presentation is described in more depth below with regards to FIG. 6.

At 508, a control allowing the user to interactively join the chat may be presented. In some implementations, this control may be presented after the user has been determined to be interested in the item. A description of the user interface and functions available during interactive chat are described in more depth below with regards to FIGS. 7A-7B. At 510, a control allowing the user to start a new chat group may be presented.

Users may also choose to view archived chat sessions. At 512, a control allowing the viewing of archived chats may be presented in user interface 500. At 514, a control allowing a search of chat sessions, both contemporaneous and archived, is presented. Searches may be made using one or more parameters. These parameters may include user designation, user name, category, item, date, ratings, and so forth. For example, a user may wish to find chat sessions which contain comments by any expert or by a particular expert who has been positively rated by other chat participants. In another example, a user may wish to search chats in a particular category, such as "digital cameras," that contain a specific model number. Searches may also be filtered based on whether the chat is contemporaneous (that is, currently taking place) or archived.

At 516, a ticker (such as a section of linearly streaming text) or other subset of a chat may be provided within user interface 500 to provide the user with a sample of what is currently happening in one or more chat groups. This ticker may report either the most current entries, entries which have been selected as most useful by users, entries generated by experts, and so forth.

As described above, users may not be presented with an indication that a chat exists until after the interest identification module 120 has determined that the user has an interest in a particular item. In other implementations, users may only be able to view chats, and not participate until after the interest identification module 120 has determined that the user is interested in the particular item. Regardless, it may be useful to present a view-only, or non-interactive, presentation of the chat to the user.

Figure 6:
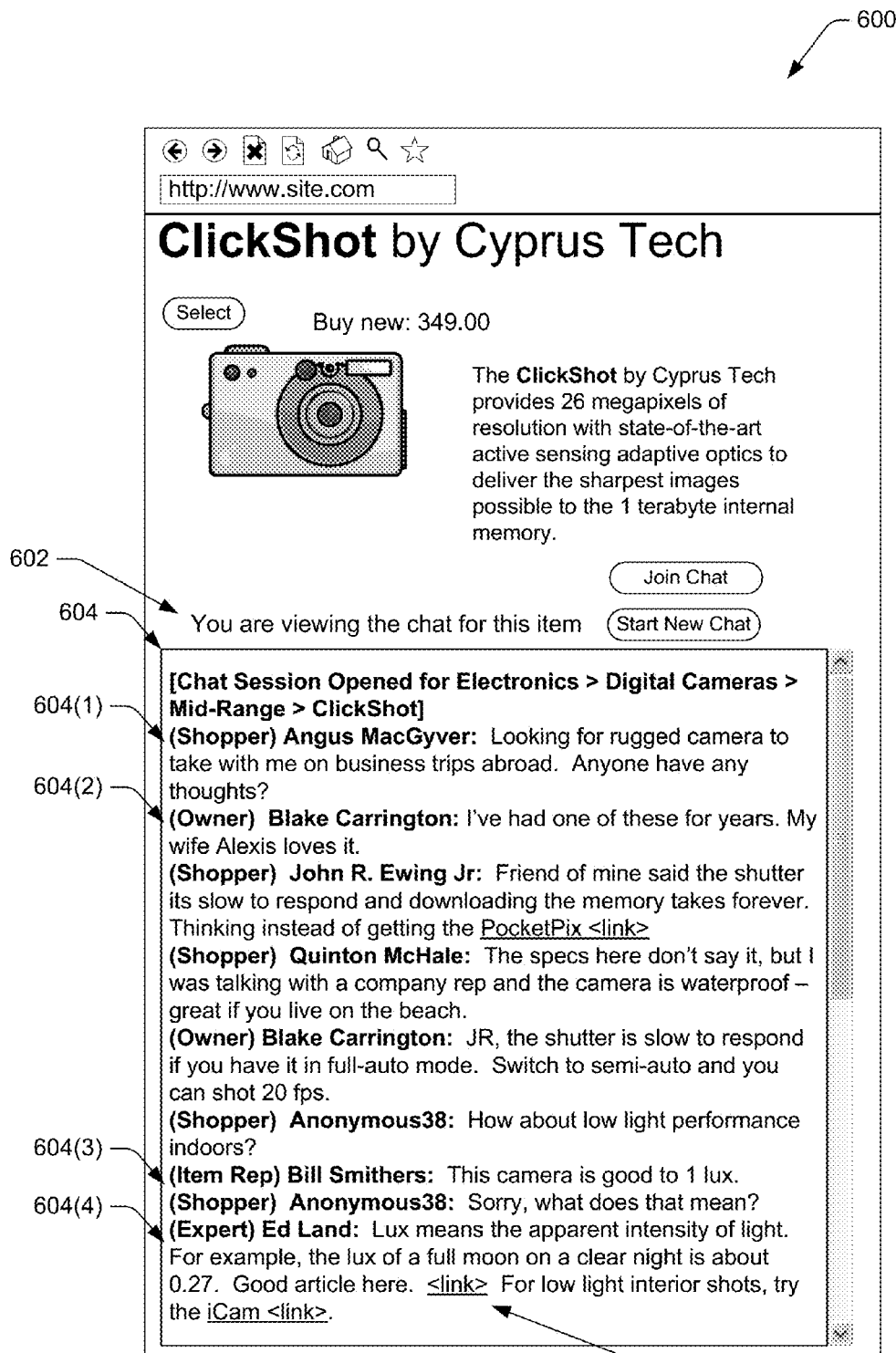
FIG. 6 illustrates a UI showing a view-only presentation of a chat, in which a user may view the chat but may not interactively participate in the chat.

FIG. 6 illustrates a UI providing a view-only presentation 600 of a chat involving seven users. At 602, a read-only (non-interactive) chat window for a text chat is depicted. Other controls to join the chat or start a new chat as previously described above may also be presented. While a text chat is depicted in these examples, other modes of communication such as voice, video, and so forth may be used as well for chatting. In some implementations, automated computer recognition of speech, gestures, facial expressions, and so forth may be used to generate information suitable for a transcript or extract of the chat session which may be used for searching, indexing, and so forth.

Several pieces of information 604 may be presented to the user within the chat window. For example, the status of a user may be indicated within the chat window. Thus, at 604(1) Angus MacGyver is identified as a "shopper," indicating that he is interested in purchasing this item or one in this category. Participant Blake Carrington is identified at 604(2) as an "owner," indicating he has previously purchased or otherwise owns the item being discussed or a similar one. Participant Bill Smithers is identified at 604(3) as being an "item rep" or item representative who represents an entity who makes, sells, supports, or otherwise has a pecuniary interest in that item. Finally, participant Ed Land is indicated at 604(4) as an "expert" in this category of digital photography. As described above, in some implementations non-commercial participants such as owners and experts may receive rewards for participating in chats.

During the chat, users may mention other items. Links to these other items and information may be shown, as depicted at 604(5). These links may be inserted manually by a user or may be automatically inserted based on the contents of the chat. For example, when function 210(9) is enabled to automatically insert hyperlinks for items referenced during the chat, mention of the "iCam" in a chat would result in a link to the "iCam" product detail page being inserted without additional user intervention. Furthermore, links to reviews, websites, articles or the like may also be included within the chat window.

Figure 7A:
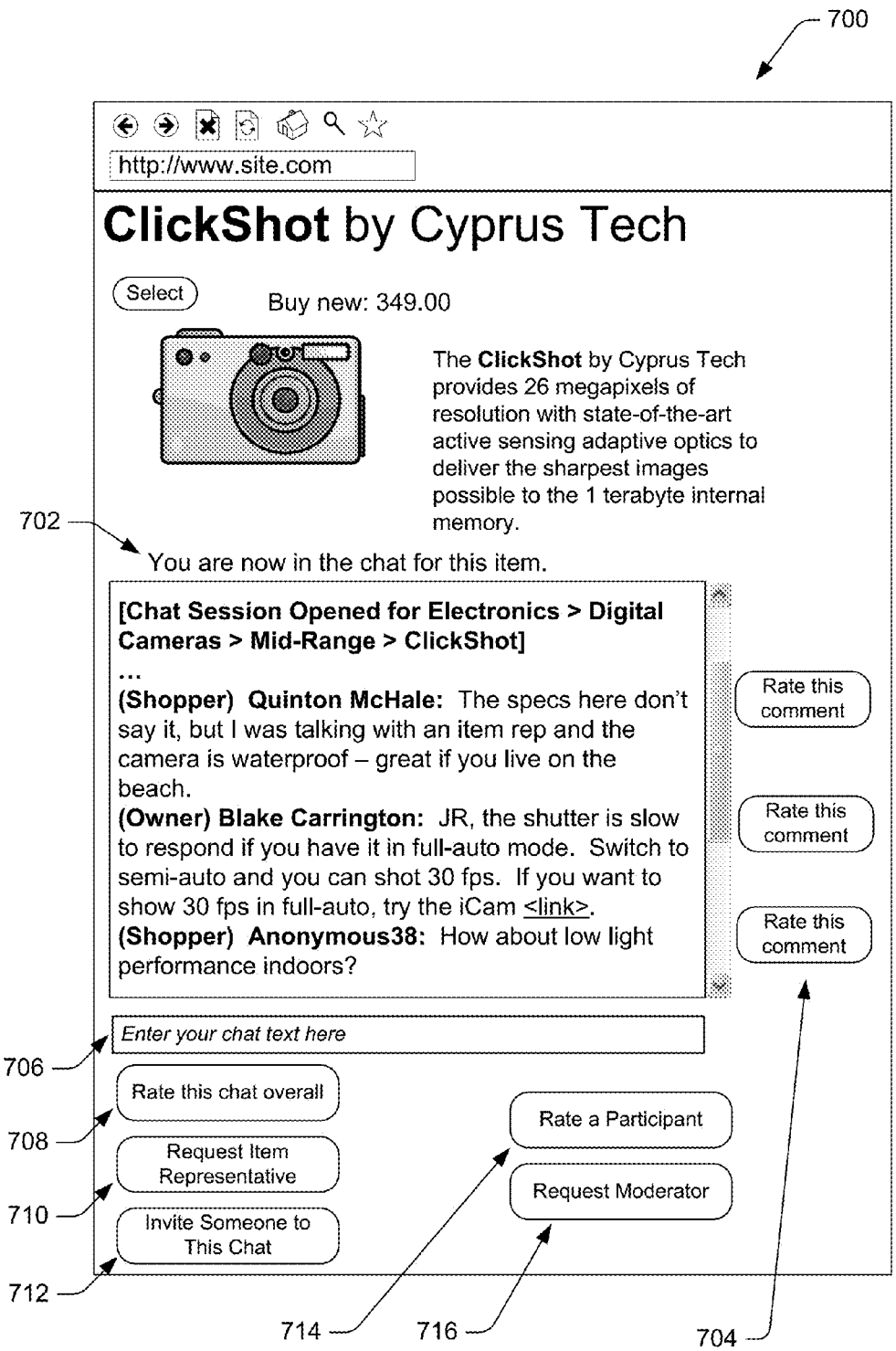
FIGS. 7A and 7B illustrate a UI showing an interactive chat where the user may both view the chat and interactively participate in the chat.

FIG. 7A illustrates an interactive chat UI 700. An interactive chat window 702 may be presented, similar to that described above with respect to FIG. 6. However, in this interactive chat window the user may participate in the chat, rate various aspects of the chat, and otherwise affect the proceedings of the chat. At 704, a control allowing the user to rate each comment may be presented. For example, suppose the users find Blake Carrington's comment in response to J. R. Ewing's question about slow shutter speed on the ClickShot enlightening. Users may then give this comment a high rating. Ratings for a comment may be used to mark the comment for future reference. Furthermore, ratings may also be used to determine the rewards provided to the commentator. Thus, Blake's comment, which was found useful, may result in Blake receiving additional rewards.

Ratings may also be weighted by designated status. For example, positive ratings from shoppers about a user may receive a higher weight than positive ratings from experts.

Conversely, negative comments about a user may result in several actions, such as removal from the particular chat, banishment from all chats, closure of user account, and so forth. Furthermore, negative ratings about an expert may result in rescinding that user's "expert" status. A user's accumulated rewards may diminish or be removed based on the user receiving negative ratings, in some implementations.

At 706, the user is presented with a control to enter text, or otherwise engage in the chat. The user may also be presented with other controls associated with chatting. At 708, the user may rate the chat overall. Such a rating may be used to incentivize eligible participants, as well as to provide an indicator to others as to what chats may be worth reviewing after they have concluded, that is, after an interactive chat has ceased.

Users may also be presented at 710 with a control to request an item representative. For example, the shopper may have a highly specific question that cannot be answered by the other chat participants. In such a situation, the user may activate the control and request an item representative join in.

Users participating in a chat may find it useful to bring in another party, such as an expert, owner, shopper, and so forth who is not in the current chat. At 712 a control is presented allowing a user to invite someone else to the chat.

At 714, the user may choose to rate a particular participant overall. For example, perhaps during the chat Blake Carrington has given generally good advice and has been helpful overall. The user may chose to rate Blake highly. Participant ratings may also be used to calculate how rewards are issued.

Finally, sometimes chat conversations wander off topic or otherwise degenerate. In such cases, the user may activate a control at 716 to request a moderator to join the chat. The moderator may be tasked with directing the course of the chat and managing the participants. In some implementations this moderator may be an agent of the online store 108. This moderator may be either a human being or an expert system or other computer program.

Figure 7B:
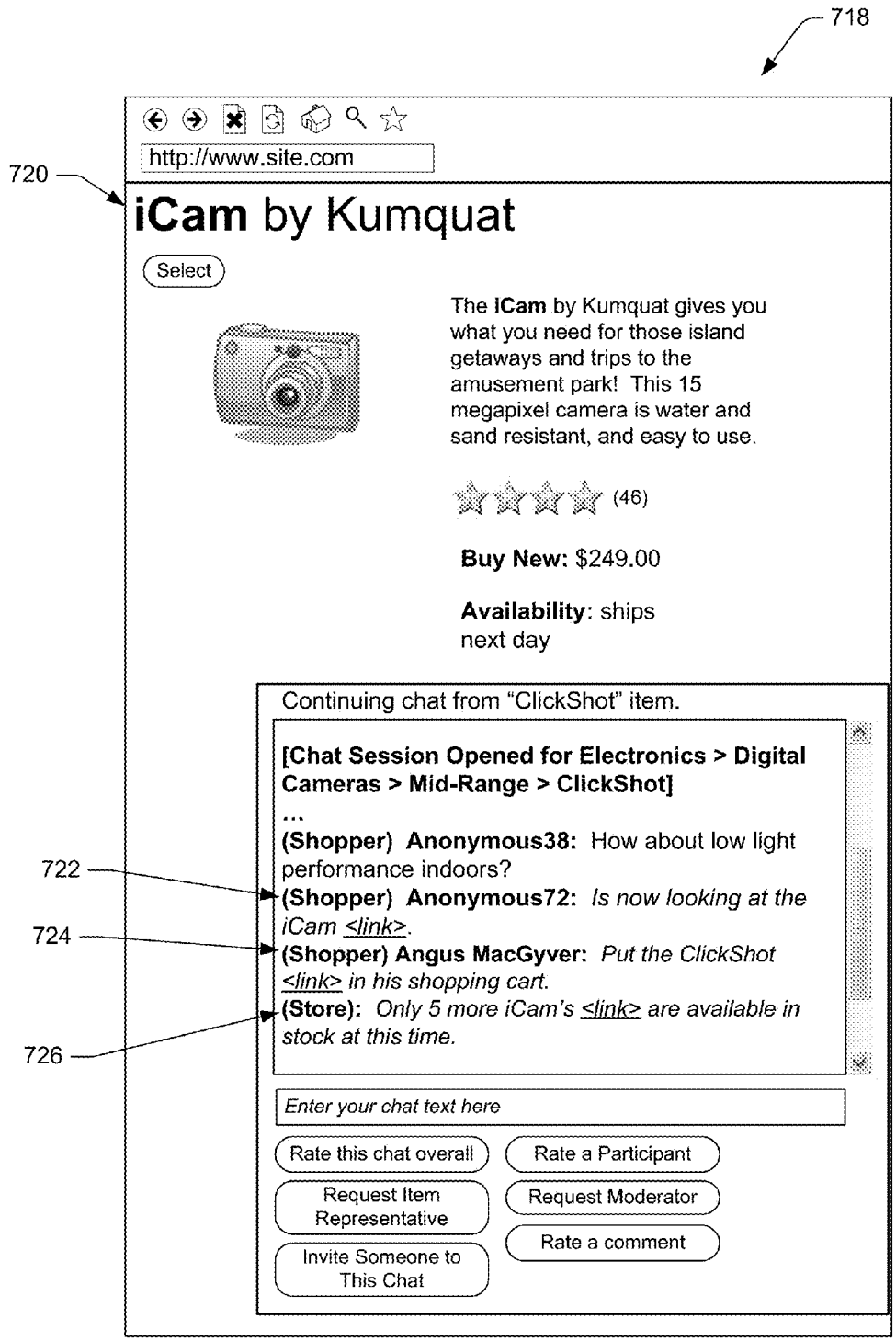

In contrast to FIG. 7A, FIG. 7B represents an alternative interactive chat UI that resides a window that is either separate from the underlying browser window or integral with the underlying browser but persistent, such that the chat UI continues to be displayed as the user navigates on the browser. As such, in this illustration, the user has navigated to another item, while the chat session remains visible in the UI. For example, the user viewing UI 700 may have selected a link to the iCam which has been presented in the chat session, and navigated to the UI shown at 718. Within UI 718 a description 720 of the iCam is presented, as is the chat window 702. In some implementations, a user may be reminded that the chat has been continued from another item, as shown in this illustration. Furthermore, in some implementations the chat session may be presented as a separate UI, such as an additional window.

Within chat window 702, information about the actions of users participating in the chat may be presented. For example, at 722 an entry has been generated which indicates that our example user "Anonymous72" has navigated to view details about the "Kumquat" item. This entry may be manually entered by a user, or may be automatically populated into the chat by a module, such as the interest identification module 120.

Other actions, such as the user adding an item to a specified list or to a shopping cart, changes in item availability, changes in item pricing, and so forth may also be auto-populated into the chat window. For example, at 724 an announcement is presented in the chat showing that user Angus MacGyver has placed the ClickShot item in his shopping cart. Continuing this example, as a result of MacGyver placing the iCam in his shopping cart, the available stock level has dropped below a pre-determined threshold, and a notification is made at 726 in the chat that only 5 more iCam's are available in stock.

Figure 8:
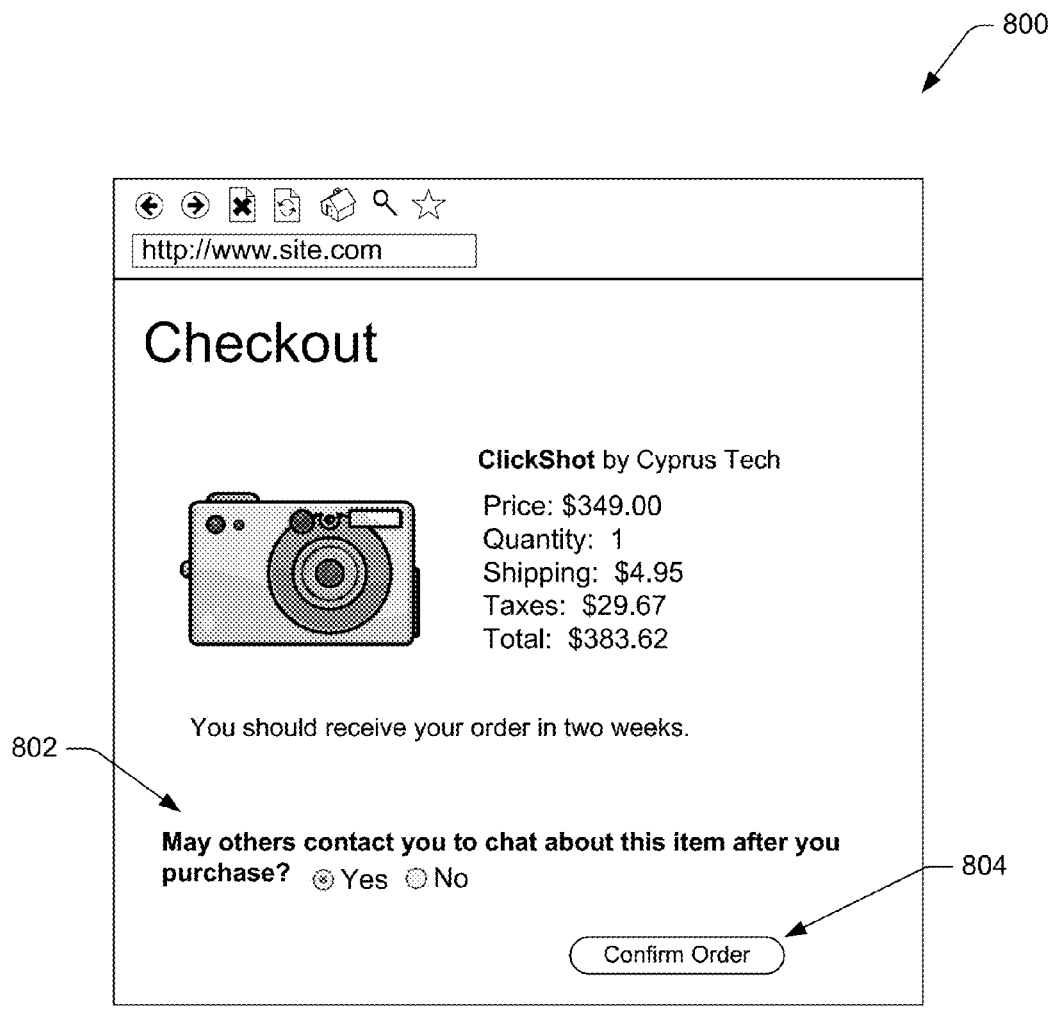
FIG. 8 illustrates a UI showing an item checkout page that queries a purchaser of an item whether others may contact the purchaser to chat about the item.

As described above, users may select in their chat preferences to designate at the time of checkout whether they would like to be contacted to chat about their purchase. FIG. 8 illustrates a UI showing a checkout including this prompt 800. At 802, a control may be presented to the user to select whether the user will permit others to contact him about the item after purchase. In this example, the user has agreed to allow others to contact him after purchase. Upon activation of the confirm order control at 804, the user may be designated as able to receive requests to join chats about this item or a related item, depending upon the user's chat preferences. In some implementations, eligibility to join chats with a designated status of "owner" may be contingent upon the user receiving the item, having the item for a pre-determined time interval after receipt, registering the product, and so forth.

Illustrative Processes

Figure 9:
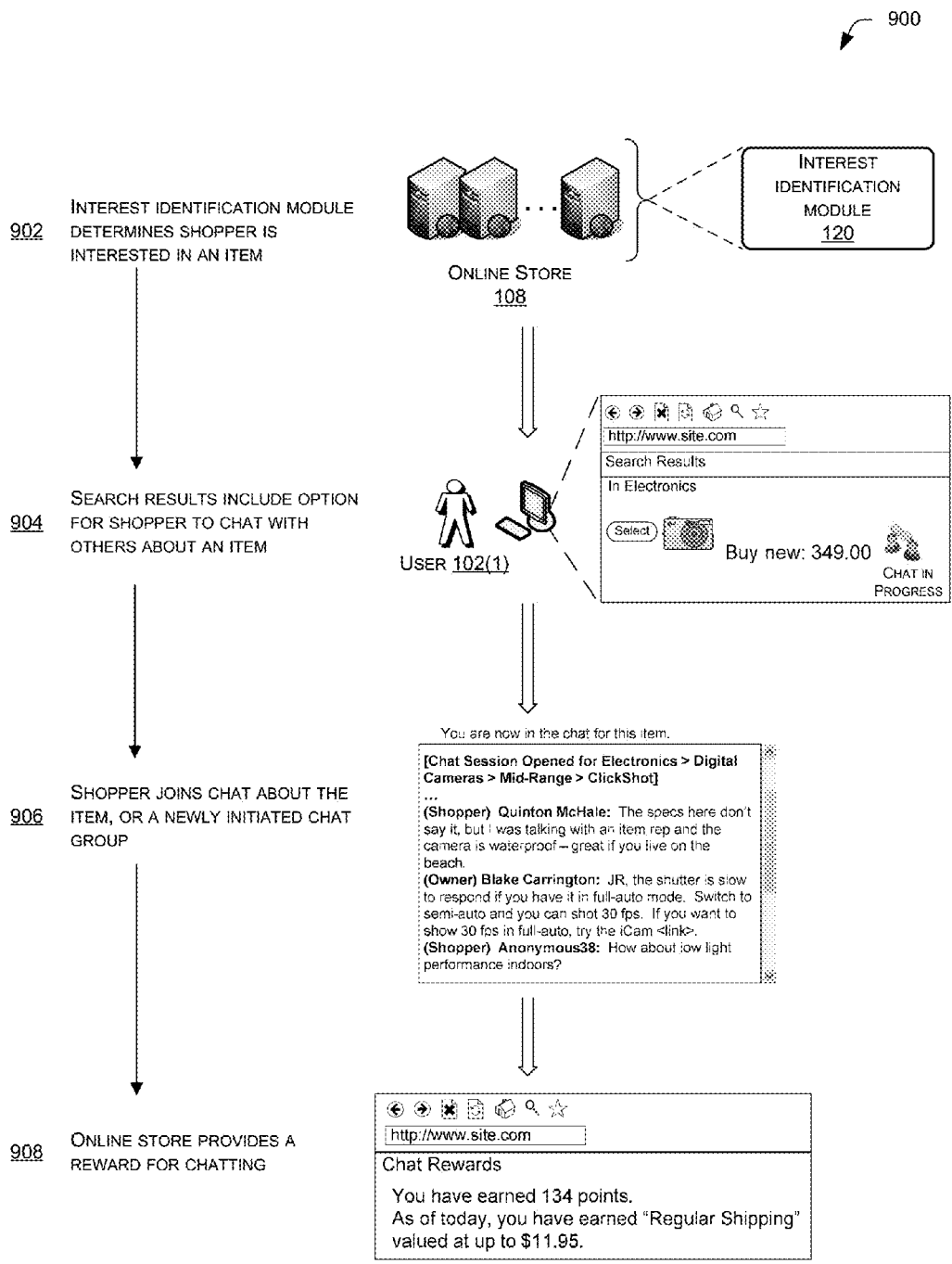
FIG. 9 is an illustrative process of identifying items of interest to a shopper and, in response, providing chat options to the shopper. This process also provides rewards to non-shopping participants.

FIG. 9 is an illustrative process 900 of identifying items of interest to a shopper and, in response, providing chat options to the shopper. This process alos provides rewards to non-shopping participants that participate in a chat session. Operation 902 shows an interest identification module 120 determining that a shopper is interested in an item, based on any of the method discussed above. Operation 904 shows the presentation of search results which include an option for the shopper to chat with participants about an item.

Operation 906 shows the shopper joining an existing chat group discussing the item, or initiating a new chat group. In some implementations, experts or other participants may also initiate chat groups. Operation 908 shows rewards being provided to at least one of the users in the chat based on this user's valued participation in the chat. In this example, the user has earned regular shipping valued at up to $11.95.

Figure 10:
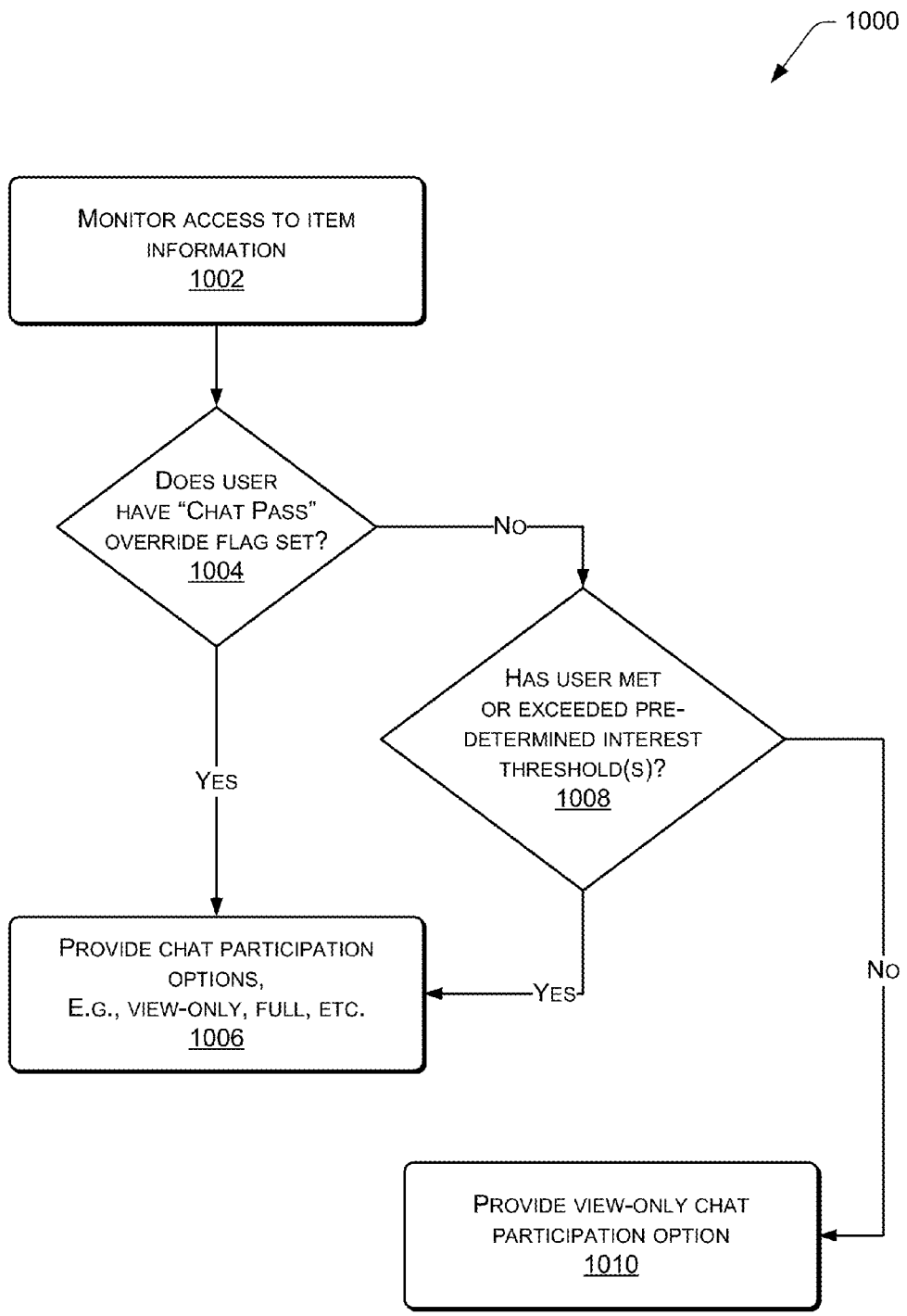
FIG. 10 is a flow diagram of a process to determine that a shopper is interested in an item and, in response, provide an option to chat about the item with other users to the shopper.

FIG. 10 shows an illustrative process 1000 of determining interest and presenting a chat control that may, but need not, be implemented using the architecture and UIs shown in FIGS. 1-8. The process 1000 (as well as process 1100 in FIG. 11) is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIGS. 1-8, but may be implemented by other architectures.

Block 1002 monitors access by a user to item information, for instance a user accessing a web page containing detail information about an item. Block 1004 determines when the user has a "chat pass" or other override flag set. When the "chat pass" override flag is set, block 1006 provides some or all available chat participation options, such as read-only, full, and so forth.

When block 1004 indicates that a "chat pass" is not present, block 1008 determines whether the user has met or exceeded the pre-determined interest threshold(s). As described above with respect to FIG. 2, one or more of several conditions may be used to determine when the user is interested in an item or category of item, such as whether an item is present on a "wish list." When the user has met or exceeded the pre-determined interest threshold(s) of block 1008, block 1006 provides some or all available chat participation options. When the user has not met or exceeded the pre-determined interest threshold(s) of block 1008, block 1010 may provide a view-only chat participation option.

As described above, shoppers may join an existing chat group or may create a new chat group. Other shoppers may join that group as described above with respect to FIG. 10. However, participants (that is, non-shoppers) may be selected or invited to the chat group based on the following process.

Figure 11:
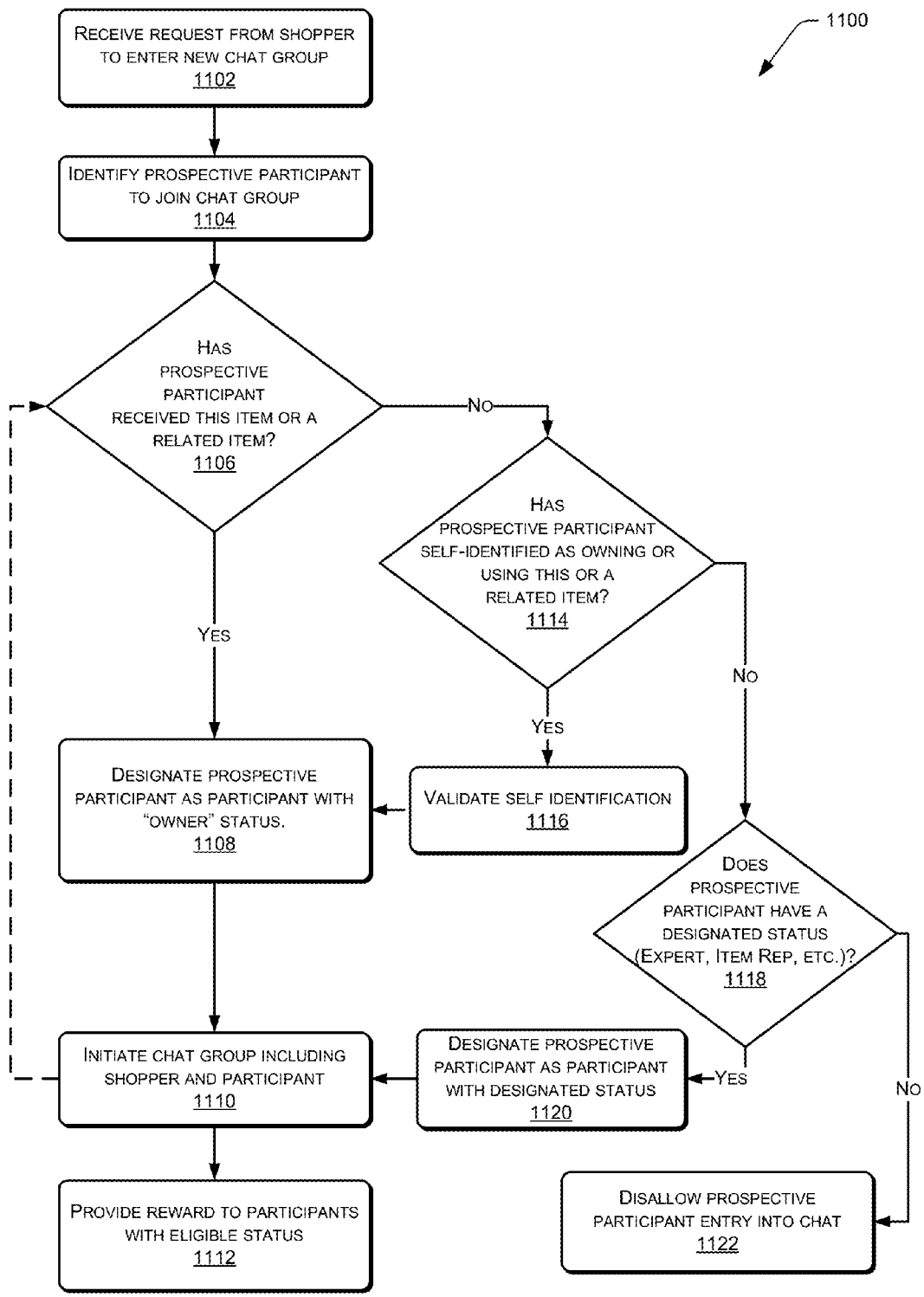
FIG. 11 is a flow diagram of a process to determine which participants to include in a new chat group request and which of the participants, if any, may receive rewards.

FIG. 11 is a flow diagram 1100 of a process to determine which participants to include in a new chat group request and which of the participants, if any, may be provided with rewards. Block 1102 receives a request from a shopper to enter a new chat group. Block 1104 identifies prospective participants to join this new chat group. These prospective participants may determined from user records stored in user database 116 based on their chat preferences, such as those described above with regards to FIG. 2.

Block 1106 determines when a prospective participant has previously received (e.g., purchased) this item or a related item. When it is determined that th user has previously received the item, block 1108 designates the prospective participant as a participant with an "owner" status. Block 1110 initiates the chat group including the shopper and participant. The process may return to block 1106 until a pre-determined number of users or participants have joined the chat. Block 1112 may then provide a reward to eligible participants based on their participation and/or based on the user ratings of their participation. For example, owners and experts who participate may receive rewards, possibly in relation to the number of comments that other users of the chat find helpful and/or based on the overall rating of each user by the other users of the chat.

Returning to block 1106, when the prospective participant has not previously received this item or a related item, block 1114 determines when the prospective participant has self-identified as owning or using this or a related item. When the user does self-identify as having previously received the item or a related item, block 1116 may validate this self identification in some implementations. For example, the prospective participant may be prompted to enter a serial number of the item they claim to own. Upon successful completion of self-validation, the process continues at block 1108 and designates the prospective participant as a participant with an "owner" status.

Returning to block 1114, when the prospective participant has not self-identified as owning or using this or a related item, block 1118 determines when the prospective participant has a designated status, such as "expert," "item rep," and so forth. When it is determined that the user is a valid expert, item representative or so forth, block 1120 designates the prospective participant as a participant having the appropriate designated status and continues to block 1110, initiating the chat group.

Returning to block 1118, when the prospective participant does not have a designated status, block 1122 disallows the prospective participant entry into the chat. Thus, only those who have a determined interest in the item are present in the chat about that item.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A computer-implemented method comprising:
    under control of one or more computer systems configured with executable instructions,
    receiving a request from a first user to access information associated with an item in an electronic catalog or a category of items in the electronic catalog;
    determining if the first user requesting access to the information has met or exceeded a pre-determined interest threshold associated with the item or the category of items in the electronic catalog;
    determining if a second user has previously purchased the item or purchased a second item in the category of items in the electronic catalog; and
    at least partly in response to determining that the first user has met or exceeded the pre-determined interest threshold and at least partly in response to determining that the second user has previously purchased the item or purchased a second item in the category of items in the electronic catalog, causing presentation of a control that facilitates a communication between the first user and the second user.

2. The computer-implemented method as recited in claim 1, wherein the item in the electronic catalog comprises a good or a service.

3. The computer-implemented method as recited in claim 1, wherein the category of items in the electronic catalog comprises a category of goods, a category of services, or both in the electronic catalog.

4. The computer-implemented method as recited in claim 1, wherein the communication between the first user and the one or more second users comprises a text communication, a voice communication, or a video communication.

5. The computer-implemented method as recited in claim 1, further comprising providing a reward to one or more second users after the one or more second users participates in the communication with the first user.

6. The computer-implemented method as recited in claim 1, further comprising:
    receiving a selection of the control from the first user; and
    at least partly in response to the receiving of the selection, initiating the communication between at least the first user and the one or more second users.

7. The computer-implemented method as recited in claim 6, wherein the communication designates each user participating in the communication according to each respective user's relationship to the item or the category.

8. The computer-implemented method as recited in claim 7, wherein each of the one or more second users are designated based on whether the one or more second users: owns or has previously purchased the item; owns or has previously purchased an item from the category of items; has previously participated in a communication about the item or the category; has been deemed an expert on the item or an item from the category of items; or has been deemed a representative for the item.

9. A system comprising:
    one or more processors;
    memory coupled to the one or more processors, and configured to store instructions that, when executed, cause the one or more processors to:
        determine that a first user is interested in a specific item stored in a database containing a plurality of items;
        determine that a second user interested in the specific item based at least partly upon a purchase history associated with the second user;
        at least partly in response to determining the first user has met or exceeded a predetermined interest threshold in the specific item, present a control to the first user on a user surface; and
        in response to a received selection of the control, initiate a communication between the first user and the second user.

10. The system of claim 9, wherein the communication comprises a text communication, a voice communication, or a video communication.

11. The system of claim 9, wherein the first user is determined to be interested in the specific item in response to one or more user events performed by the first user and associated with the specific item.

12. The system of claim 11, wherein the one or more user events comprises at least one of: including a reference to the specific item on a list associated with the first user; placing the specific item into a shopping cart associated with the first user; accessing information associated with the specific item more than a predetermined number of times; following a link associated with the specific item; or accessing information associated with the specific item more than a predetermined amount of time.

13. One or more computer-readable storage media storing instructions that, when executed by one or more processors, cause the one or more processors to perform acts comprising:
    monitoring access by a first user and a second user to information associated with an item or a category of items;

determining an interest of the first user and the second user in the item or the category of items based at least in part on the monitored access of the information;

comparing the determined interest of the first user and the second user to an interest threshold associated with the item or the category of items;

presenting, at least partly in response to determining that the determined interest of the first user meets or exceeds the interest threshold, to the first user a control on a user interface associated with the item or the category of items; and in response to a received selection of the control, initiating a communication between the first user and the second user.

14. The computer-readable storage media of claim 13, wherein the item or category of items comprises a good, a service, a category of goods or a category of services.

15. The computer-readable storage media of claim 13, the instructions further comprising:

providing the control that facilitates the communication between the first user and the second user when an override flag has been set, the override flag configured to provide access to the communication regardless of whether the first user has met or exceeded the interest threshold.

16. The computer-readable storage media of claim 13, further comprising determining the interest of the second user in the item or the category of items based on the second user's purchase of the item or an item within the category of items.

17. The computer-readable storage media of claim 13, wherein the second user has an associated user profile that indicates the second user is at least one of:

a shopper with a determined interest in the item or category of items that is similar to the first user's determined interest;

a user that has been designated as an expert on the item or on the category of items;

a user that has been designated as an official representative of the item or in the category of items;

a user that has participated in one or more previous communications regarding the item or an item in the category of items;

a user that has written a review of the item or an item in the category of items;

a user that is a prior purchaser of the item or an item in the category of items; or a user that is an owner of the item or an item in the category of items.

18. The computer-readable storage media of claim 13, wherein the communication comprises one of a text communication, a video communication, a telephone communication, or an audio communication.

* * * * *